UNITED STATES PATENT OFFICE.

N. J. WYETH, OF CAMBRIDGE, MASSACHUSETTS.

IMPROVEMENT IN COMPOSITIONS FOR MAKING BRICKS.

Specification forming part of Letters Patent No. 3,517, dated March 28, 1844.

*To all whom it may concern:*

Be it known that I, NATHANIEL J. WYETH, of Cambridge, in the county of Middlesex and State of Massachusetts, have discovered a new and useful Composition of Matter from which Bricks may be made; and I do hereby declare that the following is a full and exact specification of the several ingredients of my composition, and of the manner of compounding or mixing the same, by which my discovery may be distinguished from others of a similar class, said specification containing the claim for which I desire Letters Patent.

It is well known among mechanics that in putting up the inside brick walls and partitions of houses it is necessary from time to time to insert pieces of wood, or, as mechanics term them, "wooden bricks," into which the nails which confine the furring are driven, and it has long been a desideratum to obtain something which shall possess the essential properties of a brick, and yet, unlike the common brick, be penetrable by a nail without breaking or crumbling, and serve all the purposes of the wooden bricks or blocks above mentioned.

The composition which I have discovered may be made into bricks which will possess the qualities above mentioned, as desirable, as well as other advantageous properties which will be specified in the sequel. It is composed of clay and sand mixed with either of the following cheap combustible materials—viz., sawdust, charcoal, peat, or tan-bark after it has been used by the tanners. The combustible materials must be sufficiently pulverized to be feasibly mixed with the clay, &c. The proportions of the several ingredients, it will be evident, may be varied according to the discretion or judgment of the artisan, or his desire to form a brick more or less porous, though a very excellent quality of brick may be made from a composition formed of three parts clay to five parts of either of the combustible materials above mentioned.

The manner of compounding or mixing the ingredients and molding the brick is precisely similar to that for the ordinary brick, the substances being mixed in a common "clay-mortar mill," so called, and the brick being molded in the ordinary way.

Bricks molded from the above-specified composition may be much more cheaply burned or baked than the common kind, as the quantity of clay in them as much smaller, and the combustion or burning of a portion of the combustible material in the same greatly assists the process, and also renders the brick, when burned, considerably porous without diminishing its size or materially altering its shape. By reason of this effect it will be seen that a brick made as above described will be a good nonconductor of heat, and by the use of it the warmth and dryness of houses may be preserved and greatly enhanced. The plastering may with safety be applied directly to the brickwork without furring, and if it is desired to have furring the boards for the same may be nailed to the brick-work (made of such bricks) quite as well as into wood.

Bricks formed of the above composition may be molded and burned of any size, and may be made very serviceable in the construction of ice-houses, greenhouses, &c. They may be made at a much cheaper rate than any other kind, while the cost of transportation is much less on account of the smaller weight of such brick.

Having thus specified the ingredients, &c., of my newly-discovered composition, I shall state my claim as follows:

I do not claim mixing combustible materials with clay for making brick; but I claim mixing them in such proportions as will produce bricks possessing the above-named properties.

In testimony that the foregoing is a true specification of my said discovery I have hereto set my signature this 12th day of February, in the year 1844.

NATHL. J. WYETH.

Witnesses:
 EZRA LINCOLN, Jr.,
 GRIDLEY. I F. BRYANT.